United States Patent
Pinault

(10) Patent No.: US 12,406,383 B2
(45) Date of Patent: Sep. 2, 2025

(54) METHOD FOR MEASURING A DISTANCE SEPARATING A CAMERA FROM A REFERENCE OBJECT

(71) Applicant: Essilor International, Charenton-le-Pont (FR)

(72) Inventor: Philippe Pinault, Nogent sur Marne (FR)

(73) Assignee: Essilor International, Charenton-le-Pont (FR)

( * ) Notice: Subject to any disclaimer, the term of this patent is extended or adjusted under 35 U.S.C. 154(b) by 482 days.

(21) Appl. No.: 17/826,763

(22) Filed: May 27, 2022

(65) Prior Publication Data
US 2022/0383526 A1 Dec. 1, 2022

(30) Foreign Application Priority Data
May 31, 2021 (EP) .................................... 21176970

(51) Int. Cl.
*G06T 7/13* (2017.01)
*G06T 7/50* (2017.01)
*G06T 7/60* (2017.01)

(52) U.S. Cl.
CPC .................. *G06T 7/50* (2017.01); *G06T 7/13* (2017.01); *G06T 7/60* (2013.01); *G06T 2207/20164* (2013.01)

(58) Field of Classification Search
None
See application file for complete search history.

(56) References Cited

U.S. PATENT DOCUMENTS

| | | | |
|---|---|---|---|
| 2006/0001688 A1* | 1/2006 | Chabreck | B82Y 40/00 347/19 |
| 2012/0274762 A1* | 11/2012 | Hu | G01C 11/30 348/E5.045 |

(Continued)

FOREIGN PATENT DOCUMENTS

| | | | | |
|---|---|---|---|---|
| CN | 106225687 | * | 12/2016 | G01B 11/00 |
| CN | 106651957 | * | 5/2017 | G06T 7/73 |

(Continued)

OTHER PUBLICATIONS

J. Huber and V. Graefe, "Motion stereo for mobile robots," ISIE '93—Budapest: IEEE International Symposium on Industrial Electronics Conference Proceedings, Budapest, Hungary, 1993, pp. 263-270, doi: 10.1109/ISIE.1993.268797 (Year: 1993).*

(Continued)

*Primary Examiner* — Beniyam Menberu
(74) *Attorney, Agent, or Firm* — Oblon, McClelland, Maier & Neustadt, L.L.P.

(57) ABSTRACT

A method for measuring a distance separating a camera from a reference object including a predetermined number of corners arranged in a pattern and at least two reference points separated by a reference length. The method includes acquiring an image including the reference object with the camera, detecting corners in the image, attributing a class to each corner, based on an orientation of the corner, detecting the reference object in the image based on the corners and attributed classes, placing the reference points in the image based on the corners of the reference object and measuring an imaged length separating the reference points, and comparing the reference length to the imaged length and obtaining the distance separating the camera from the reference object.

12 Claims, 2 Drawing Sheets

(56) References Cited

U.S. PATENT DOCUMENTS

| | | | | |
|---|---|---|---|---|
| 2013/0293705 | A1* | 11/2013 | Schorr | G01B 11/24 |
| | | | | 356/601 |
| 2015/0054917 | A1* | 2/2015 | Coon | G06F 21/36 |
| | | | | 348/46 |
| 2016/0033262 | A1* | 2/2016 | Kessler | G01B 11/2513 |
| | | | | 348/135 |
| 2016/0120402 | A1 | 5/2016 | Limon | |
| 2016/0188995 | A1* | 6/2016 | Somanath | G06T 7/593 |
| | | | | 382/203 |
| 2017/0079523 | A1 | 3/2017 | Limon | |
| 2017/0202450 | A1 | 7/2017 | Carrafa et al. | |
| 2018/0357791 | A1* | 12/2018 | Dworakowski | G06T 7/74 |
| 2019/0307324 | A1 | 10/2019 | Limon | |
| 2020/0311362 | A1* | 10/2020 | Plummer | G06T 7/536 |
| 2021/0038069 | A1 | 2/2021 | Carrafa et al. | |
| 2022/0128347 | A1* | 4/2022 | Vohinder | G01B 11/03 |
| 2023/0092401 | A1* | 3/2023 | Plummer | G06K 7/10722 |
| | | | | 235/462.41 |

FOREIGN PATENT DOCUMENTS

| | | | | |
|---|---|---|---|---|
| CN | 108875723 | * | 11/2018 | G06K 9/20 |
| EP | 2966594 | * | 1/2016 | G06K 9/46 |
| EP | 3739376 | * | 11/2020 | G02C 13/00 |
| JP | 2011179980 | * | 9/2011 | G01B 11/00 |
| JP | 2018179584 | * | 11/2018 | G01B 11/00 |
| KR | 20140140285 | * | 12/2014 | G06K 9/46 |

OTHER PUBLICATIONS

Extended European Search Report issued Oct. 28, 2021 in European Application 21176970.8 filed on May 31, 2021, 5 pages (with Written Opinion).

Harris et al., "A Combined Corner and Edge Detector", Alvey Vision Conference, 1988, 5 pages.

Rosten et al., "Machine Learning for high-speed corner detection", European Conference on Computer, Jul. 2006, 15 pages.

Kadhim et al., "A method to improve corner detectors (Harris, Shi-Tomasi & FAST) using adaptive contrast enhancement filter", Periodicals of Engineering and Natural Sciences, vol. 8, No. 1, Mar. 2020, pp. 508-515.

Office Action issued Mar. 18, 2025, in corresponding Chinese Patent Application No. 202210606487.2, with English translation herein, 17 pages.

* cited by examiner

METHOD FOR MEASURING A DISTANCE SEPARATING A CAMERA FROM A REFERENCE OBJECT

FIELD OF THE INVENTION

The invention relates to a method for measuring a distance separating a camera from a reference object.

The invention also relates to a computer program for implementing this method, a computer-readable storage medium for implementing said program, and an equipment for implementing the method.

BACKGROUND OF THE INVENTION

There are several existing methods for measuring a distance between a sensor and a reference object, requiring equipment of different complexities, and bringing various levels of accuracy for the measured distance.

There is also an interest in providing a method that can be implemented with a simple setup by an untrained user, preferably at home, with a camera and a computer or smartphone.

An example of application requiring accurate measurement of such a distance is the evaluation of the quality of vision of a user with an optotype, to determine if a corrective equipment is needed, and ways to implement such an evaluation at home with no specific equipment.

This application requires a sufficiently accurate measurement of the optical distance separating the user's eyes from the optotype, to get an accurate evaluation of the quality of vision at a specific distance.

The distance can then be determined using a reference object of known dimensions and a camera, for example a smartphone camera held close to the eyes.

The reference object can be a physical object of known dimensions, comprising reference points that can be easily detected in an image based on colorimetry for example.

Alternatively, the reference object can be detected in the image manually, or through an algorithm, based on its shape, like a credit card or customer card.

The distance is determined based on the size of an image of a reference object of known dimensions taken by the camera, depending on a focal length of said camera.

More specifically, the ratio of dimensions of the real object and the image taken by the camera, after adjustment for pixel size, is equal to the ratio of the distance between the camera and the reference object to the focal length of the camera.

However, these methods have several limitations for home applications.

Indeed, most smartphone cameras have a short focal length, around a few millimeters, while the distances to be measured are of several meters. The image of the reference object is thus small and comprises only a few pixels in either directions, making the measured length of the reference object in the image inaccurate.

Furthermore, the image can be partially obscured, for example by a hand holding the smartphone, or distorted due to variations in brightness in the environment.

This makes detection of the reference object in the image and measurement of its length a complicated process, requiring a high amount of computing time and presenting a risk of inaccuracies.

SUMMARY OF THE INVENTION

The proposed method improves these aspects, by improving accuracy of the measurement and reducing computing time, while keeping the required equipment and user training at a minimal level.

To this end, the invention relates to a method for measuring a distance separating a camera from a reference object, the reference object comprising a predetermined number of corners arranged in a pattern and at least two reference points separated by a reference length, the method comprising steps of:
  acquiring an image comprising the reference object with the camera,
  detecting corners in the image,
  attributing a class to each corner, chosen from a plurality of classes, based on an orientation of the corner,
  detecting the reference object in the image based on the corners and attributed classes,
  placing the reference points in the image based on the corners of the reference objects and measuring an imaged length separating the reference points, and
  comparing the reference length to the imaged length and obtaining the distance separating the camera from the reference object.

This method allows for a fast and robust detection of the reference object in the image, by basing the detection on corners of the object. This allows for a detection of the reference object in a single step and is more reliable in the case where a part of the image is distorted or obscured.

Furthermore, the imaged length is not measured directly between corners or borders, but between reference points based on said corners, and is thus less dependable on distortion and partial obscuring of the image.

The step of detecting the reference may comprise forming combinations of a predetermined number of corners based on the respective class of each corner and comparing each combination to the pattern of the reference object, based on respective positions of the corners of the combination relative to each other.

This allows for faster detection of the reference object in the image, thus reducing total computing time.

Forming combinations of corners may comprise substeps of:
  forming subcombinations comprising one less corner than the predetermined number of corners of the combinations,
  selecting subcombinations based on the possibility for the subcombination to be part of a combination in the pattern,
  completing the selected subcombinations by adding an additional corner to obtain a combination, and
  comparing each combination to the pattern of the reference object to detect the reference object in the image.

This feature further reduces computing time for detecting the reference object in the image.

Each combination of corners may comprise three or four corners, each corner being taken from a different class.

The corners may be attributed a class based on a direction of a brightness transition across the corner, from a lighter part of the image to a darker part of the image or vice-versa.

This feature allows for a robust classification of the corners with reduced risk of errors.

The plurality of classes may comprise four classes corresponding to four directions of the brightness transition along two perpendicular axes, and a fifth class for discarded corners that cannot be attributed one of the four classes.

The reference points may be selected as equidistant from at least two edges or at least two corners of the reference object.

The reference points may be chosen as the centers of two rectangles or squares of the reference object.

These features allow the reference points to be located independently of a potential dilatation or distortion of the image based on a brightness level in the environment.

The imaged distance may be measured with an accuracy under a pixel size of the image.

This allows for a better accuracy, as the pixel size is not negligible compared to the imaged reference length.

The reference object may comprise at least twelve corners arranged in a pattern comprising two squares and a rectangle.

The reference object may be shaped like two squares of a first grey level, the squares sharing a common border, over a field of a second grey level different from the first grey level.

Such a pattern allows for the above-mentioned features regarding corners and the reference length, and is simple enough to display on a screen, manufacture, or print.

The reference object may be an image displayed on a screen of a smartphone.

This allows an efficient control of the dimensions of the reference object and requires minimal external equipment.

The invention further relates to a computer program comprising instructions which, when the program is executed by a processing circuit, cause the processing circuit to carry out the method as described above.

The invention relates as well to a computer-readable storage medium comprising instructions which, when executed by a processing circuit, cause the processing circuit to carry out the method as described above.

The invention also relates to an equipment comprising at least:
a camera, and
a processing circuit connected to said camera and configured to implement the method according as described above.

DETAILED DESCRIPTION OF EMBODIMENTS

Figure 1:
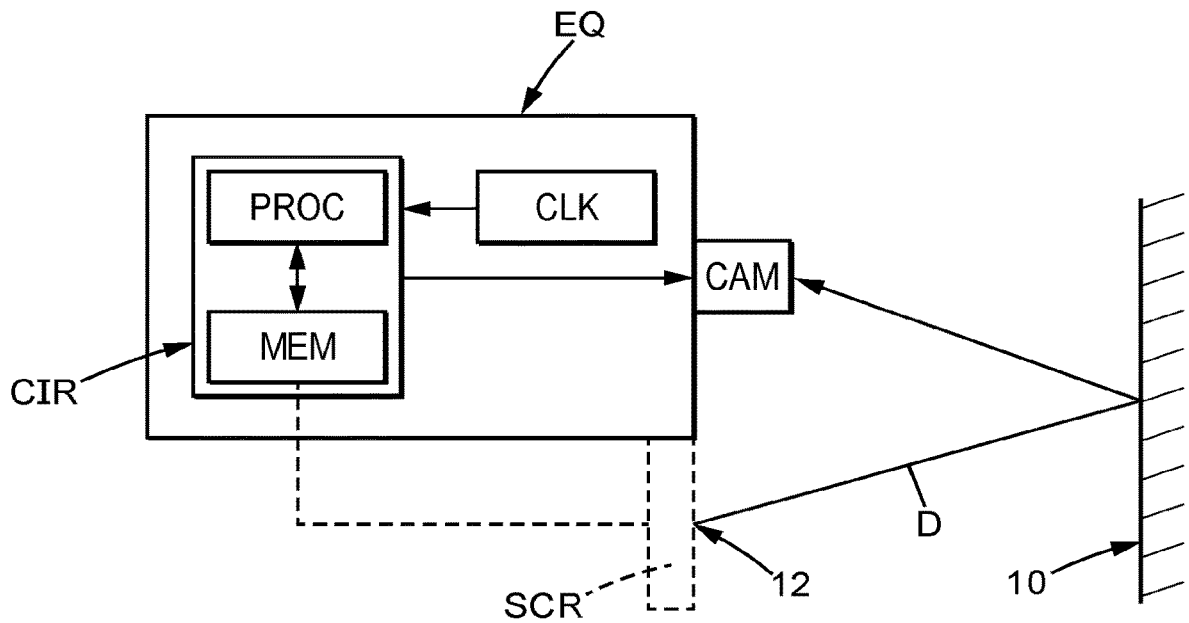
FIG. 1 is a schematic representation of an equipment for implementing a method according to the invention.

An equipment EQ for implementing a method according to the invention is shown on FIG. 1. The equipment comprises a processing circuit CIR comprising a processor PROC and a memory MEM, the processing circuit being cadenced by a clock CLK.

Information for executing a program implementing the method may be stored on the memory, as well as other data like intermediate distance measurements.

The processing circuit is able to execute said computer program to implement the method as described below.

The equipment further comprises a camera CAM, which may be internal to the equipment or external to the equipment. The camera is connected to and controlled by the processing circuit.

The equipment may further comprise at least one screen SCR, connected to and controlled by the processing circuit.

The equipment may be a smartphone.

As shown on FIG. 1, the method can be implemented in front of a mirror 10, in order to measure a distance D between a reference object 12 and the camera. In this example, the reference object is displayed on the screen of the device.

The distance D is an optical distance, from the reference object to the mirror and back to the camera and is thus roughly equal to twice the distance separating the device from the mirror.

Figure 2:
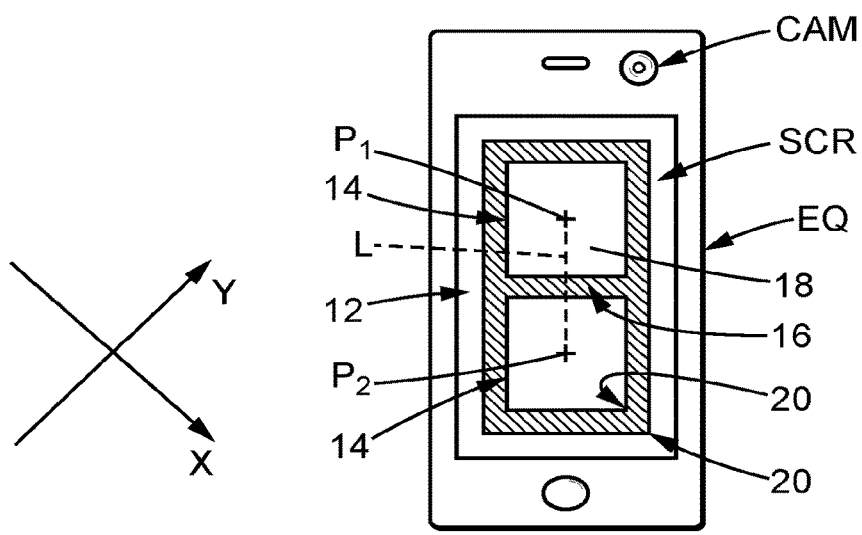
FIG. 2 is a front view of a smartphone displaying a reference object for implementing a method according to the invention.

The equipment is also shown on FIG. 2, in this case a smartphone with a screen and camera.

The screen displays the reference object 12 facing the mirror.

In this example, the reference object is an image comprising two rectangles or squares 14 sharing a common side 16, displayed with a first grey level, over a field 18 with a second grey level different from the first grey level.

For example, the squares are darker, and the field is brighter, or the opposite. The first grey level and second grey level are preferably taken separated from each other by at least 50% of a full amplitude of a grey level scale.

The first grey level and second grey level are preferably not either pure white or pure black, as a maximal contrast can cause distortion in the image when the brightness in the environment is too low or too high.

The reference object comprises twelve corners 20 arranged in a pattern, each corner separating a lighter part of the image from a darker part of the image.

Each corner thus presents a direction of transition from a lighter part of the image to a darker art of the image, or vice-versa. Said transition can be oriented along one of four possible directions, said directions extending along two diagonal axes X, Y perpendicular to each other.

For example, the four directions can be designated as +X, −X, +Y, −Y, depending on the orientation of the transition for the brighter part to the darker part.

The pattern shown on FIG. 2 comprises three corners of each possible transition direction.

The reference object comprises two reference points P1, P2, separated by a reference length L.

The reference points are selected as the centers of both squares and are equidistant from four corners of the reference object with four different orientation arranged as a square.

Figure 3:
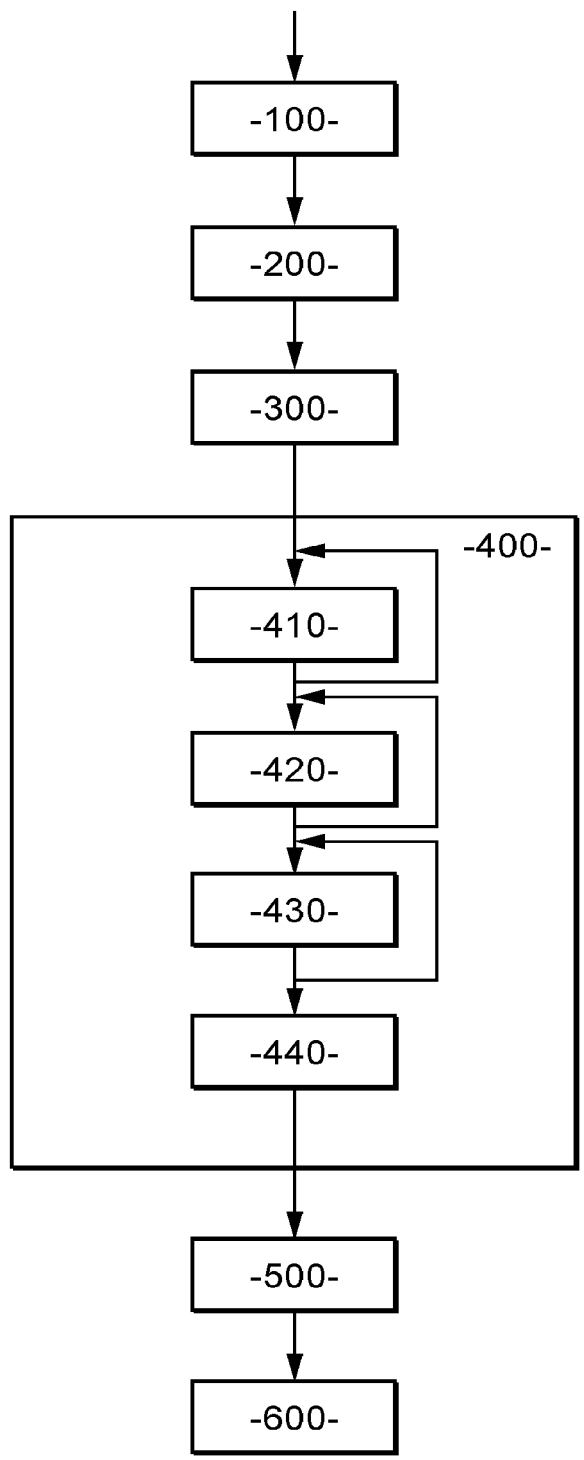
FIG. 3 is a schematic representation of a method according to the invention.

This allows the location of the reference points to be independent form the brightness of the environment, which affects the width of the borders of the reference object on the image. as the reference points are not chosen as actual points of said borders or corners but as equidistant from them, they do not vary due to brightness variations The method for measuring the distance separating the reference object and the camera will now be described, in reference to FIG. 3.

The method is implemented by an equipment as described above, through instructions stored in the memory and executed by the processing circuit.

The method comprises an acquiring step 100, during which an image comprising the reference object is acquired with the camera. The acquired image is stored in the memory.

The method comprises a detection step 200, during which corners are detected in the image.

The detection of corners is implemented through a specific algorithm. Examples of such algorithms include the combined corner and edge detection by Harris published in 1988 at the Alvey Vision Conference, the corner detection method by Shi-Tomasi published in 1994 in the Proceedings of IEEE Conference on Computer Vision and Pattern Recognition, and the FAST corner detection by Rosten et Drummond published in 2006 in the European Conference on Computer, volume 1 titled «Machine learning for high-speed corner detection».

The latter choice is preferred for faster computing and more robust detection.

The method comprises an attributing step 300, during which a class, chosen from a plurality of classes, is attributed to each detected corner, based on an orientation of the corner.

In this example, the detected corners are distributed in five classes, comprising the four classes for corners oriented in the four directions +X, −X, +Y, −Y as described above, and a fifth class for corners that could not be attributed one of these four classes.

The method then comprises a detecting step 400, during which the reference object is detected in the image based on the corners and attributed classes.

During the detecting step 400, combinations of a predetermined number of corners are formed based on the respective class of each corner, and successively compared to the pattern of the reference object to detect the reference object in the image.

For example, each combination of corners comprises four corners, each corner being taken from a different class.

Advantageously, forming combinations of corners comprises the following four substeps.

In a first substep 410, subcombinations are formed comprising two corners each, each corner being taken from a different class.

The positions of the corners of the subcombinations relative to one another are tested, in relation to their respective classes and their expected arrangement in the pattern. For example, a corner in the +X class is expected to be located lower in the image than a corner with a +Y class.

If the corners are in the expected pattern, the subcombination is validated for the next substep. Else, it is discarded and another subcombination is tested.

In a second substep 420, a third corner from a third non represented class is added to the validated subcombination.

The new subcombination of three corners is then tested on the possibility for the subcombination to be part of a square or rectangle in the pattern.

The relative positions of the corners of the subcombination is also considered based on their respective classes, as in the previous substep.

Furthermore, the three corners have to be arranged in a triangle with a right angle, thus being potentially a part of a square or rectangle.

A criterion based on the relative distances between the corners can also be used to quickly discard subcombinations with a largely incorrect aspect ratio.

In a third substep 430, the selected subcombinations are completed by adding an additional corner taken from the fourth unrepresented class, to obtain a combination of four corners, and tested as previously.

The position of the fourth corner relative to the other three corners is considered based on its class and expected position. The four corners are expected to form a square or rectangle, with each corner in a relative position depending on its class.

The third substep are iterated to test every possible fourth corner completing the subcombination, until a valid combination is detected. If no valid combination can be found, another subcombination is then considered.

In a fourth substep 440, the completed subcombinations are compared to the pattern of the reference object.

The valid combinations, corresponding to squares and rectangle in the image, are compared to the complete pattern of the reference object to detect the reference object in the image.

Advantageously, valid subcombinations of three corners that would lead to a complete pattern when combined with other combinations are considered, to accommodate for an eventual obscuring of one of the corners in the image.

The method then comprises a measuring step 500, during which the reference points are placed in the image based on the corners of the reference object, and an image length separating the reference points is measured.

The reference points P1, P2 are placed in the middle of both squares in the image. The imaged length is thus not measured between two visible points of the image but between points that do not vary based on brightness or partial obscuring of the image.

Furthermore, this allows for a sub-pixel accuracy of the measurement of the imaged length, as the reference points are not detected on pixels of the image.

The method finally comprises a calculation step 600, in which the distance separating the camera from the reference object is calculated based on the imaged length, the reference length and the focal length of the camera.

The described method allows for an accurate and robust determination of the distance separating the reference object from the camera, that requires a low computing time, and can be implemented with minimal equipment in a home setup, for example with a smartphone and a mirror only.

The invention claimed is:

1. A method for measuring a distance separating a camera from a reference object using a device including the camera, a display, and processing circuitry, the reference object having a predetermined number of corners arranged in a pattern and reference points separated by a reference length, the method comprising:

displaying the reference object on the display of the device;

acquiring, with the camera, an image comprising the reference object, detecting, by the processing circuitry, corners in the acquired image, attributing a class, of a plurality of classes, to each corner, based on an orientation of the corner, detecting, by the processing circuitry, the reference object in the acquired image based on the detected corners and the attributed classes, determining, by the processing circuitry, the reference points in the acquired image based on the detected corners of the reference object, and measuring an imaged length separating the reference points, and calculating, by the processing circuitry, the distance separating the camera from the reference object based on a ratio of the reference length to the imaged length, and a focal length of the camera, wherein the step of detecting the reference object further comprises forming combinations of a predetermined number of corners based on the respective class of each corner and comparing each combination to the pattern of the reference object, based on respective positions of the corners of the combination relative to each other; and forming combinations of corners further comprises:

forming subcombinations comprising one less corner than the predetermined number of corners of the combinations, selecting subcombinations based on the possibility for the subcombination to be part of a combination in the pattern, completing the selected subcombinations by adding an additional corner to obtain a combination, and comparing each combination to the pattern of the reference object to detect the reference object in the image.

2. The method according to claim 1, wherein each combination of corners comprises three or four corners, each corner being taken from a different class of the plurality of classes.

3. The method according to claim 1, wherein the attributing step further comprises attributing the class to each corner based on a direction of a brightness transition across the corner, from a lighter part of the image to a darker part of the image or vice-versa.

4. The method according to claim 3, wherein the plurality of classes comprises four classes corresponding to four directions of the brightness transition along two perpendicular axes, and a fifth class for discarded corners that cannot be attributed one of the four classes.

5. The method according to claim 1, wherein the reference points are selected as equidistant from at least two edges or at least two corners of the reference object.

6. The method according to claim 5, wherein the reference points are chosen as centers of two rectangles or squares of the reference object.

7. The method according to claim 1, wherein the imaged distance is measured with an accuracy smaller than a pixel size of the image.

8. The method according to claim 7, wherein the reference object comprises at least twelve corners arranged in a particular pattern comprising two squares and a rectangle.

9. The method according to claim 8, wherein the reference object is shaped like two squares of a first grey level, the squares sharing a common border, over a field of a second grey level different from the first grey level.

10. The method according to claim 1, wherein the device is a smartphone comprising the camera, the display, and the processing circuitry, the method being implemented using a mirror.

11. A non-transitory computer-readable storage medium comprising instructions which, when executed by the processing circuitry, cause the processing circuitry to perform the method according to claim 1.

12. The device, comprising:
the camera, and
the processing circuitry connected to said camera and configured to implement the method according to claim 1.

* * * * *